US012804747B2

(12) United States Patent
Dong

(10) Patent No.: US 12,804,747 B2
(45) Date of Patent: Nov. 17, 2026

(54) COMMUNICATION METHOD AND COMMUNICATION APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 336 days.

(21) Appl. No.: 18/294,735

(22) PCT Filed: Aug. 4, 2021

(86) PCT No.: PCT/CN2021/110614
§ 371 (c)(1),
(2) Date: Feb. 2, 2024

(87) PCT Pub. No.: WO2023/010345
PCT Pub. Date: Feb. 9, 2023

(65) Prior Publication Data

US 2024/0349373 A1 Oct. 17, 2024

(51) Int. Cl.
*H04W 84/12* (2009.01)
*H04W 8/22* (2009.01)
(Continued)

(52) U.S. Cl.
CPC ............. *H04W 76/15* (2018.02); *H04W 8/22* (2013.01); *H04W 52/0216* (2013.01); *H04W 52/0261* (2013.01); *H04W 76/12* (2018.02)

(58) Field of Classification Search
CPC ....... H04W 76/15; H04W 8/22; H04W 76/12; H04W 52/0229; H04W 76/14; H04W 52/02
See application file for complete search history.

(56) References Cited

U.S. PATENT DOCUMENTS

2008/0219228 A1 9/2008 Seok et al.
2010/0271995 A1* 10/2010 Seok ................ H04W 52/0219 370/311
(Continued)

FOREIGN PATENT DOCUMENTS

CN 101557330 A 10/2009
CN 101675625 A 3/2010
(Continued)

OTHER PUBLICATIONS

3GPP TSG-RAN WG3#112-E, R3-211670 Title: Correction of PDU Session Container (Year: 2021).*
(Continued)

*Primary Examiner* — Faruk Hamza
*Assistant Examiner* — Abusayeed M Haque
(74) *Attorney, Agent, or Firm* — Volpe Koenig

(57) ABSTRACT

A communication method, apparatus, and computer-readable medium that improve transmission efficiency in a wireless communication network. The transmission efficiency is improved by: determining a first message frame in one of multi-links, and sending the first message frame. The first message frame includes support capability information indicating a support capability for a tunneled direct link setup (TDLS) peer power save mode in the multi-links, where the multi-links can support TDLS communication.

17 Claims, 2 Drawing Sheets

(51) Int. Cl.

| | |
|---|---|
| ***H04W 52/02*** | (2009.01) |
| ***H04W 76/12*** | (2018.01) |
| ***H04W 76/15*** | (2018.01) |

(56) References Cited

U.S. PATENT DOCUMENTS

| | | | |
|---|---|---|---|
| 2010/0303185 A1 | 12/2010 | Haartsen | |
| 2011/0038291 A1 | 2/2011 | Seok | |
| 2012/0163261 A1* | 6/2012 | Vedantham | H04W 52/0206 370/311 |
| 2021/0007104 A1 | 1/2021 | Raghavan et al. | |
| 2021/0014833 A1 | 1/2021 | Akkarakaran et al. | |
| 2021/0051587 A1 | 2/2021 | Wu et al. | |
| 2021/0211871 A1* | 7/2021 | Chu | H04W 12/0431 |

FOREIGN PATENT DOCUMENTS

| | | |
|---|---|---|
| CN | 101911632 A | 12/2010 |
| CN | 104104539 A | 10/2014 |
| CN | 104244333 A | 12/2014 |
| CN | 111405610 A | 7/2020 |
| WO | 2009124475 A1 | 10/2009 |
| WO | 2021112556 A1 | 6/2021 |

OTHER PUBLICATIONS

Abhishek Patil, Qualcomm Inc. TDLS procedure in multi-link operation IEEE 802.11-21/0240r8, Mar. 31, 2021.

"Multi cell D2D resource allocation strategy based on partitioning and interference restricted areas", China Academic Journal Electronic Publishing House, Retrieved from the internet URL <http:www.cnki.net>, (c) 1994-2023, 7 pages. (English Abstract Included).

* cited by examiner

COMMUNICATION METHOD AND COMMUNICATION APPARATUS

CROSS-REFERENCE TO RELATED APPLICATIONS

The present application is a U.S. National Stage of International Application No. PCT/CN2021/110614, filed on Aug. 4, 2021, the contents of all of which are incorporated herein by reference in their entirety for all purposes.

BACKGROUND OF THE INVENTION

The current Wi-Fi technology, studied in the scope of 320 MHz bandwidth transmission, multi-band aggregation, and coordination, etc., is expected to increase the rate and throughput by at least four times compared with existing standards, and is applied in scenarios of video transmission, AR (augmented reality), VR (virtual reality), etc.

The multi-band aggregation and coordination refer to simultaneous communication between devices at frequency bands of 2.4 GHz, 5 GHZ, and 6 GHZ, etc., and a new MAC (media access control) mechanism needs to be defined to manage the simultaneous communication between devices at a plurality of frequency bands. In addition, it is also expected that the multi-band aggregation and coordination can support low-latency transmission.

The current multi-band aggregation and system technology will support a maximum bandwidth of 320 MHz (160 MHz+160 MHz), and may also support a bandwidth of 240 MHz (160 MHz+80 MHz) and other bandwidths.

SUMMARY OF THE INVENTION

The present disclosure relates to a field of wireless communications, and in particular to a communication method and a communication apparatus in multi-links.

According to an example of the present disclosure, a communication method is provided. The communication method includes: determining a first message frame in one of multi-links, and sending the first message frame; or receiving the first message frame in one of multi-links, where the first message frame includes support capability information indicating a support capability for a tunneled direct link setup (TDLS) peer power save mode in the multi-links, and where the multi-links can support TDLS communication.

According to an example of the present disclosure, a communication apparatus is provided. The communication apparatus includes a processing module, configured to determine a first message frame in one of multi-links, where the first message frame includes support capability information indicating a support capability for a TDLS peer power save mode in the multi-links, and where the multi-links can support TDLS communication; and a transceiving module, configured to send the first message frame.

According to an example of the present disclosure, a communication apparatus is provided. The communication apparatus includes a transceiving module, configured to receive a first message frame in one of multi-links, where the first message frame includes support capability information indicating a support capability for a TDLS peer power save mode in the multi-links, and where the multi-links can support TDLS communication; and a processing module, configured to control an execution of a communication operation based on the first message frame.

According to an example of the present disclosure, an electronic device is provided. The electronic device includes a memory, one or more processors, and a computer program stored in the memory and runnable on the one or more processors that, when executed by the one or more processors, causes the one or more processors to implement the method described above.

According to an example of the present disclosure, a non-transitory computer-readable storage medium is provided, storing a computer program which, when executed by one or more processors, causes the one or more processors to implement the method described above.

BRIEF DESCRIPTION OF DRAWINGS

The above and other features of the examples of the present disclosure will become more apparent from the detailed description of the examples of the present disclosure with reference to the accompanying drawings, in which.

DETAILED DESCRIPTION OF THE INVENTION

The following descriptions, with reference to the accompanying drawings, are provided to assist in a full understanding of various examples of the present disclosure as defined by the appended claims and their equivalents. The various examples of the present disclosure include various specific details, but these specific details are merely considered to be illustrative. In addition, for the sake of clarity and conciseness, descriptions of well-known techniques, functions, and constructions may be omitted.

Terms and words used in the present disclosure are not limited to written meanings, but are merely used by the inventors to enable a clear and consistent understanding of the present disclosure. Therefore, for those skilled in the art, the description of various examples of the present disclosure is merely provided for illustrative purposes and not for the purpose of limitation.

It should be understood that, unless the context clearly states otherwise, the singular forms "a/an," "one," "the," and "said," as used herein, may also include a plural form. It should be further understood that the expression "include/comprise" used in the present disclosure refers to the presence of the described features, integers, steps, operations, elements, and/or components, but does not preclude the presence or addition of one or more other features, integers, steps, operations, elements, components, and/or a combination of them.

It will be understood that although the terms "first," "second," and the like may be used here to describe various elements, these elements should not be limited to these terms. These terms are merely used to distinguish one element from another. Therefore, a first element discussed below may be referred to as a second element without departing from the teachings of the examples.

It should be understood that when an element is described as being "connected" or "coupled" to another element, the described element may be directly connected or coupled to the other element, or there may be an intermediate element. Moreover, the "connected" or "coupled" as used here may include a wireless link or wireless coupling. The term "and/or" or the expression "at least one of" as used includes any and all combinations of one or more related listed items.

All terms (including technical terms and scientific terms) as used have the same meanings as commonly understood by those of ordinary skill in the art of the present disclosure, unless otherwise defined.

In current technologies, a station (STA) and an access point (AP) may be multi-link device (MLD), that is, support a function of simultaneous sending and/or reception in multi-links at the same time. Therefore, in the current technologies, there may be multi-links between the STA and the AP, and communications between the two devices in multi-links is being studied.

Figure 1:
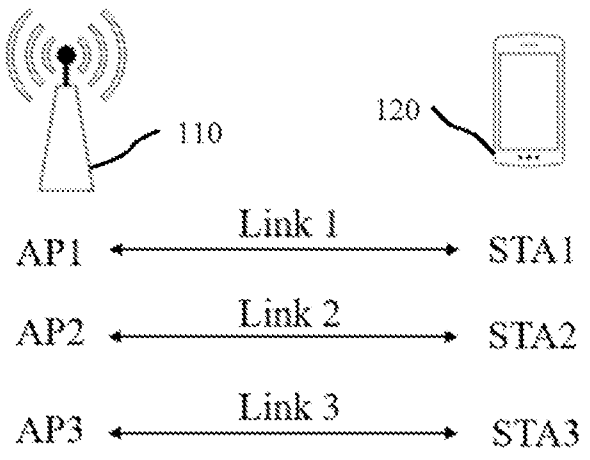
FIG. 1 is an example diagram illustrating a communication scenario in multi-links according to an example.

FIG. 1 is an example diagram illustrating a communication scenario in multi-links according to an example.

In a wireless local area network, a basic service set (BSS) may include an AP and one or more stations (STAs) communicating with the AP. A basic service set may be connected to a distribution system DS through its AP, and then connected to another basic service set to form an extended service set ESS.

The AP is a wireless switch used for a wireless network, and also is an access device for a wireless network. An AP device may be used as a wireless base station, and functions as a bridge to connect a wireless network with a wired network. With this AP, wired and wireless networks may be integrated.

The AP may include a software application and/or a circuit to enable other types of nodes in the wireless network to communicate with the wireless network both externally and internally through the AP. In some examples, as an example, the AP may be a terminal device or a network device equipped with a Wi-Fi (wireless fidelity) chip.

As an example, the STA may include, but is not limited to: a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IOT) device, etc.

In an example of the present disclosure, the AP and the STA may support multi-link devices. For example, they may be represented as AP MLDs and non-AP STA MLDs, respectively. For ease of description, an example in which one AP communicates with one STA in multi-links is described in the following. However, the examples of the present disclosure are not limited to this.

In FIG. 1, just as an example, an AP MLD 110 may represent an access point that supports a multi-link communication function, and a non-AP STA MLD 120 may represent a station that supports the multi-link communication function. Referring to FIG. 1, the AP MLD 110 may work in three links, i.e., secondary AP 1, AP 2, and AP 3, as shown in FIG. 1; and the non-AP STA MLD 110 may also work in three links, i.e., secondary STA 1, STA 2 and STA 3, as shown in FIG. 1. In the example in FIG. 1, it is assumed that AP 1 communicates with STA 1 through a corresponding first link Link 1. Similarly, AP 2 and AP 3 communicate with STA 2 and STA 3 through a second link Link 2 and a third link Link 3, respectively. In addition, Link 1 to Link 3 may be multi-links at different frequencies, for example, links etc., at 2.4 GHz, 5 GHZ, and 6 GHz or several links with the same or different bandwidths at 2.4 GHz, 5 GHZ, and 6 GHz. In addition, a plurality of channels may exist in each link. It should be understood, however, that the communication scenario shown in FIG. 1 is merely illustrative, and the idea of the present disclosure is not limited to this. For example, the AP MLD may be linked to a plurality of non-AP STA MLDs, or in each link, the AP may communicate with a plurality of other types of stations.

Figure 2:
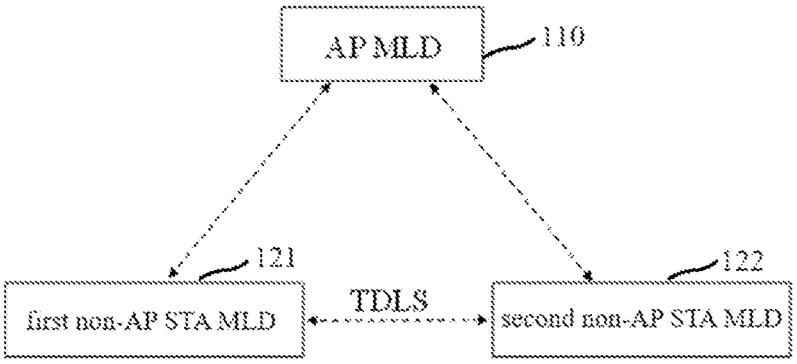
FIG. 2 is an example diagram illustrating tunneled direct link setup (TDLS) according to an example.

To improve the transmission efficiency, the non-AP STA MLDs may support a tunneled direct link setup (TDLS) function. FIG. 2 is an example diagram illustrating a tunneled direct link setup (TDLS) according to an example.

Referring to FIG. 2, a tunneled direct link setup (TDLS) may be implemented between a first non-AP STA MLD 121 and a second non-AP STA MLD 122, allowing direct communication (e.g., transfer of data) between the first non-AP STA MLD 121 and the second non-AP STA MLD 122, without going through an access point multi-link device AP MLD 110. It will be understood that, although shown in FIG. 2, the first non-AP STA MLD 121 and the second non-AP STA MLD 122 are both linked to the same access point multi-link device AP MLD 110, but the present disclosure is not limited to this. For example, the first non-AP STA MLD 121 and the second non-AP STA MLD 122 may be linked to different AP MLDs, respectively.

One of the first non-AP STA MLD 121 and the second non-AP STA MLD 122 may perform a TDLS discovery request as a TDLS initiator, and the other may perform a TDLS discovery response as a TDLS responder, and then a tunneled direct link is set up between the first non-AP STA MLD 121 and the second non-AP STA MLD 122 through a TDLS setup process.

For example, the TDLS setup process may include a TDLS setup request, a TDLS setup response, and a TDLS setup confirm.

The STA, which establishes a TDLS link may be in a PS (power save) mode in a link that has already been established. In other words, the non-AP STA MLD will support TDLS, and accordingly support the PS mode. However, since the existing mechanism merely supports a single-link operation, while the device in the current study supports multi-link communication, the corresponding PS mechanism also needs to adapt to multi-links.

Figure 3:
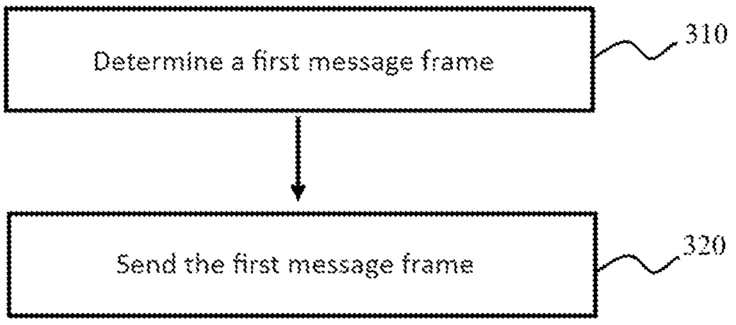
FIG. 3 is a flowchart illustrating a communication method according to an example.

FIG. 3 is a flowchart illustrating a communication method according to an example. The communication method shown in FIG. 3 may be applied to a sender. According to an example of the present disclosure, the sender may be a "TDLS setup requester" or a "TDLS setup responder".

Referring to FIG. 3, in step 310, a first message frame is determined in one of multi-links; and in step 320, the first message frame is sent. In an example of the present disclosure, a link used to send the first message frame may be the same as or different from a link used to determine the first message frame, which will not be specifically limited in the present disclosure.

According to an example of the present disclosure, the first message frame may include support capability information indicating a support capability for a TDLS peer power save mode in the multi-links, and the multi-links can support TDLS communication. That is, in the examples of the present disclosure, the multi-links may refer to multi-links (referred to as "TDLS links" below) for TDLS communication supported by a non-AP STA MLD to which the sender belongs. In the following, a TDLS peer PSM may be the same as a power save mode.

For example, when the communication method shown in FIG. 3 is applied to the TDLS setup requester (i.e., the sender is a TDLS setup requester), the first message frame may be a TDLS setup request frame, and the first message frame may carry support capability information of the TDLS setup requester for the TDLS peer PSM in multi-links. For example, when the communication method, as shown in FIG. 3, is applied to the TDLS setup responder (i.e., the sender is a TDLS setup responder), the first message frame may be a TDLS setup response frame, and the first message frame may carry support capability information of the TDLS setup responder for the TDLS peer PSM in the multi-links. However, the present disclosure is not limited to this, and other frames that can realize TDLS communication are also feasible.

In the examples of the present disclosure, there may be many ways to determine the first message frame. For example, the first message frame may be generated according to at least one of the following: network conditions, load conditions, hardware capabilities of a sending/receiving device, service types, or relevant protocol provisions, which are not specifically limited in the examples of the present disclosure. In the examples of the present disclosure, the first message frame may also be acquired from an external device, which is not specifically limited in the examples of the present disclosure.

For the sake of convenience, the first message frame is described in the following by taking a TDLS setup request frame or a TDLS setup response frame as an example. In such examples, the TDLS setup request frame or the TDLS setup response frame may carry the support capability information described above in the form of an information element (e.g., an extended capability information element). For example, the extended capability information element may have a format as shown in Table 1 below.

TABLE 1

| Format of the extended capability information element | | | |
|---|---|---|---|
| | Element ID | Length | Extended Capability |
| Byte (octet) | 1 | 1 | Variable |

Referring to Table 1, the extended capability information element may include: an element identification (Element ID) that identifies the extended capability information element, a length field (Length) that represents length information of the extended capability information element, and an extended capability field (Extended Capability). Table 1 shows that both the element identification and the length field have a size of 1 byte, and that the size of the extended capability field is variable, but the present disclosure is not limited to this, and the size of each field can be changed differently depending on the actual information parameters carried.

The extended capability field may be set to different values to represent different capabilities of corresponding devices. For example, the extended capability field may represent a capability of the TDLS setup requester in a case that the first message frame is the TDLS setup request frame, and the extended capability field may represent a capability of the TDLS setup responder in a case that the first message frame is the TDLS setup response frame.

For example, when set to a first specific value (e.g., but not limited to, "29"), the extended capability field may represent a TDLS peer PSM support subfield, which indicates the support capability information for the TDLS peer power save mode in multi-links. According to the examples of the present disclosure, it is identified that the TDLS peer power save mode is supported in the multi-links, when an active primitive of the TDLS peer power save mode (e.g., dot11 TDLS Peer PSM Activated) is set to a first specific value (e.g., but not limited to "true") and in a case that the support capability information (the TDLS peer PSM support subfield) is set to a second specific value (e.g., but not limited to, "1"). The active primitive of the TDLS peer power save mode (dot11 TDLS Peer PSM Activated) may be set at the MAC layer. The "TDLS peer power save mode is supported in the multi-links" may refer to the TDLS peer power save mode being supported in the present link that determines (sends) the first message frame, or in a link that is enabled during the establishment of a plurality of TDLS links. If the support capability information (TDLS peer PSM support subfield) is set to a third specific value (e.g., but not limited to, "0"), it is indicated that the TDLS peer power save mode is not supported in the present link or in the enabled link. In other words, the PS mode is identified as an MLD level, not a link level. That is, it is possible to set, in one link, the PS mode (MLD level) in multi-links.

According to the examples of the present disclosure, the non-AP STA MLD may reuse PSM bits (e.g., TDLS peer PSM support subfield) in the extended capability information elements of the TDLS setup request frame and the TDLS setup response frame to identify that the non-AP STA MLD supports the PS mode and supports the PS mode in all links, i.e., the PS mode is identified as the MLD level, not the link level.

Figure 4:
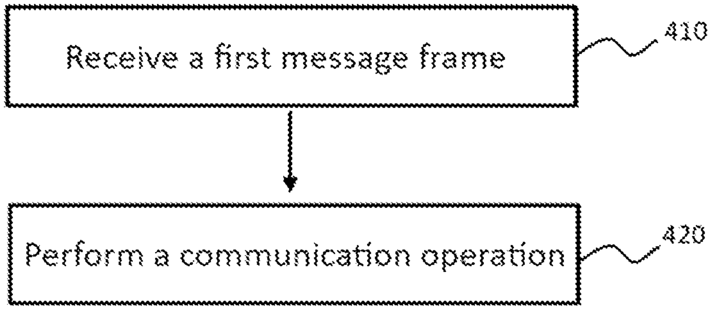
FIG. 4 is a flowchart illustrating a communication method according to an example.

FIG. 4 is a flowchart illustrating a communication method according to an example. The communication method shown in FIG. 4 may be applied to a receiver. According to an example of the present disclosure, the receiver may be a "TDLS setup requester" or a "TDLS setup responder".

In step 410, the first message frame is received in one of the multi-links. The multi-links may refer to a plurality of TDLS links. For example, in a case where the receiver is the TDLS setup requester, the first message frame may be a TDLS setup response frame, and the first message frame may carry support capability information of the TDLS setup responder for the TDLS peer PSM in the multi-links. For example, in a case where the receiver is the TDLS setup responder, the first message frame may be a TDLS setup request frame, and the first message frame may carry support capability information of the TDLS setup requester for the TDLS peer PSM in the multi-links. The first message frame and the support capability information carried in the first message frame may be similar to the examples described with reference to FIG. 3 and Table 1, and the repeated descriptions are omitted here to avoid redundancy.

In step 420, a communication operation may be performed based on the first message frame. For example, the receiver may determine capabilities supported by the sender, based on the information carried in the first message frame, and perform the operation based on the sender's capabilities in subsequent communications.

According to the communication method shown in FIG. 3 and FIG. 4, capability information for the TDLS peer power save mode in multi-links (a plurality of TDLS links) may be exchanged between the sender and the receiver, or between the TDLS setup requester and the TDLS setup responder, thus performing effective TDLS communication and power saving based on the corresponding capability information. If the capability information indicates that both parties can support the TDLS peer power save mode in the multi-links, in the TDLS communication process, periodic wakeup information in the multi-links may be further negotiated when one party is about to enter the power save mode, thus ensuring the timely reception of the information while ensuring power saving. That is, the communication method shown in FIG. 3 or FIG. 4 may also include: acquiring a second message frame in one of the multi-links. The second message frame may include the periodic wakeup information corresponding to at least one of the multi-links. An example of acquiring the second message frame and an example of the periodic wakeup information will be detailed later with reference to FIG. 5, FIG. 6, and Table 2.

Figure 5:
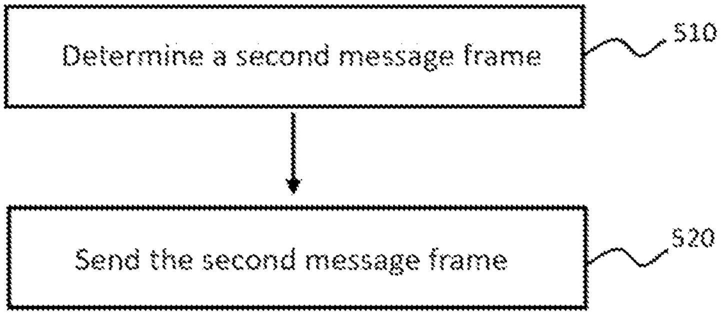
FIG. 5 is a flowchart illustrating a communication method according to an example.

FIG. 5 is a flowchart illustrating a communication method according to an example. The communication method shown in FIG. 5 may be applied to a TDLS peer power save mode (PSM) initiator (TDLS peer PSM initiator). The TDLS peer PSM initiator is a STA that is about to enter the power save mode.

According to the examples of the present disclosure, either the TDLS setup requester or the TDLS setup responder may be used as the TDLS peer PSM initiator.

For example, in a case where the initiator performs the communication method shown in FIG. 3 is about to enter the power save mode (i.e., the initiator is a TDLS peer PSM initiator), the communication method shown in FIG. 3 described above may further include the communication method shown in FIG. 5. For example, in a case that the receiver that performs the communication method shown in FIG. 4 is about to enter the power save mode (i.e., the receiver is the TDLS peer PSM initiator), the communication method shown in FIG. 4 described above may further include the communication method shown in FIG. 5.

Referring to FIG. 5, in step 510, a second message frame is determined in one of the multi-links (i.e., the second message frame is acquired); and in step 520, the second message frame is sent. In the examples of the present disclosure, the link configured to send the second message frame may be the same as or different from the link configured to determine the second message frame, which will not be specifically limited in the present disclosure. As a non-limiting example, the second message frame may be a TDLS peer PSM request frame.

According to an example of the present disclosure, the second message frame may include periodic wakeup information corresponding to at least one of the multi-links. The multi-links may refer to a plurality of TDLS links supported by a non-AP STA MLD to which the TDLS peer PSM initiator belongs. At least one link may refer to a TDLS link that is about to enter the power save mode. According to the communication method shown in FIG. 5, the periodic wakeup information in the present link or other links may be negotiated in one link.

As a descriptive example merely, the second message frame may carry the periodic wakeup information corresponding to at least one of the multi-links in the form of information elements. For the sake of description, the periodic wakeup information is described in the following by taking the wakeup schedule information elements as an example. The wakeup schedule information elements may have a format as shown in Table 2 below.

TABLE 2

Format of wakeup schedule information elements

| Element ID | Length | Offset | Interval | Awake window slot | Maximum awake window duration | Idle count | Link ID1 | Link ID2 | . . . |
|---|---|---|---|---|---|---|---|---|---|

Referring to Table 2, the wakeup schedule information elements may include: an element identification (element ID) that identifies the wakeup schedule information elements, a length field (Length) that represents the length information of the wakeup schedule information elements, and the periodic wakeup information.

In addition, it may be understood that each of the elements shown in Table 2 exists independently and is, for example, listed in the same table, but this does not mean that all elements in the table must exist at the same time as shown in the table. Accordingly, those skilled in the art can understand that the value of each element in the table of the present disclosure is an independent example.

The meaning of the periodic wakeup information may be that data is received/sent by performing periodic wakeup during a specific period when the corresponding STA is in the power save mode. In the examples of the present disclosure, the specific period may be defined in terms of an awake window as a unit. In the following, the specific period may also be referred to as an "awake time".

According to the examples of the present disclosure, the periodic wakeup information may include: a link identification (e.g., Link ID1 and Link ID2 in Table 2) corresponding to each link that is about to enter the TDLS peer power save mode, and information related to the awake time.

In the examples of the present disclosure, the link identification (e.g., Link ID1 and Link ID2) may have a plurality of bits to identify combination information of an operating spectrum, a bandwidth/channel, and/or a BSSID. In the examples of the present disclosure, unlike the example shown in Table 2, the link that is about to enter the TDLS peer power save mode may be identified in the form of a link set. For example, the link set may include bits that correspond to a plurality of TDLS links respectively. When a corresponding bit is set to a specific value (e.g., but not limited to, "1"), it may be indicated that the corresponding link is about to enter the TDLS peer power save mode. In addition, although two links (i.e., links identified by Link ID1 and Link ID2, respectively) are shown in Table 2, the present disclosure is not limited to this, and more or fewer link identifications may be included in Table 2.

In the examples of the present disclosure, the information related to the awake time includes: start information of an awake window, end information of the awake window, and count information of the awake windows.

According to the examples of the present disclosure, the start information of the awake window may include an offset identification (Offset) and an interval identification (Interval).

For example, the offset identification (Offset) is set based on a timing synchronization function (TSF) parameter. For example, the offset identification (Offset) may be the time between TSF 0 and the start moment of a first awake window, in a unit of microseconds. For example, an interval identification (Interval) may be set to the time between start moments of two consecutive awake windows, in a unit of microseconds. For example, the awake window begins at a TSF value, and the TSF value satisfies a condition determined based on the TSF value, the offset identification, and the interval identification. For example, "the TSF value satisfies a condition determined based on the TSF value, the offset identification and the interval identification" may refer to that, for example, the TSF value satisfies an equation TFS mod Interval-Offset, where mod represents a modulo operation. However, this is merely illustrative, and other methods used to determine the start of the awake window are also included in the scope of the present disclosure. In the examples of the present disclosure, the TSF parameter is carried and broadcast by an AP MLD in a beacon frame, and is consistent for a non-AP STA MLD that has established multi-link communication with the AP MLD.

According to the examples of the present disclosure, the end information of the awake window may include an awake window slot and a maximum awake window duration. For example, the awake window slot may be set to a duration of the awake window in a unit of a backoff slot. For example, the maximum awake window duration may be set to a duration of the awake window in a unit of microseconds.

In the examples of the present disclosure, the end of the awake window may be defined by means of the awake window slot and/or the maximum awake window duration.

For example, the awake window ends when an awake window slot counter reaches 0 or when the maximum awake window duration is reached (whichever comes first). The awake window slot counter may perform a count-down. A start value of the awake window slot counter at the start of the awake window will be equal to the value of the awake window slot in Table 2. The awake window slot counter starts to count at the start of the awake window and stops counting when it reaches 0.

For example, when one of the awake window time slots or the maximum awake window duration in Table 2 is set to 0, the end of the awake window may be defined by the other.

According to the examples of the present disclosure, the count information of the awake windows (e.g., idle count in Table 2) is set to a count of consecutive awake windows. A separate addressed frame is not received during said count of consecutive awake windows before the wakeup schedule is deleted. That is, the count information of the awake windows may represent a count of consecutive awake windows during which a device remains awake. The period for each awake window may be defined by means of the start information of the awake window and the end information of the awake window described above. During a plurality of consecutive awake windows defined by the idle count, at least a keep-alive frame is sent to a peer non-AP STA MLD within the awake window to identify that one or more links that establish the PS mode keep-alive. The power save mode (e.g., sleep state) can be maintained at times other than a plurality of consecutive awake windows defined by the idle count.

In the examples of the present disclosure, information related to the awake time may be set to be the same or different for at least one link that is about to enter the power save mode. The format of the awake schedule information elements shown in Table 2 may be changed differently accordingly.

For example, when there is a link that is about to enter the power save mode, a single offset identification, a single interval identification, a single awake window slot, a single maximum awake window duration, a single idle count, and a single link identification may be included in Table 2.

For example, when there are multi-links that are about to enter the power save mode, information related to the awake time corresponding to the multi-links, respectively, may be included in Table 2. That is, an offset identification, an interval identification, an awake window slot, a maximum awake window duration, an idle count, and a link identification corresponding to each of the multi-links may be included.

For example, when there are multi-links that are about to enter the power save mode, in Table 2, part of information parameters in the information related to the awake time may be considered to a plurality of parameters, and the other part of the information parameters in the information related to the awake time may be considered as a single parameter. For example, the offset identification, the interval identification, the awake window slot, and the maximum awake window duration may be single, respectively, while the idle count and the link identification may be plural (the count is equal to the number of links that are about to enter the power save mode), respectively. For example, the offset identification, the interval identification, the awake window slot, the maximum awake window duration and the idle count may be single, respectively, while the link identification may be plural (the count is equal to a count of links that are about to enter the power save mode). In such examples, a single information parameter may be applied to multi-links (i.e., a single information parameter is the same in respective links), and a plurality of information parameters may be applied to corresponding links among the multi-links, respectively.

In the case of a single idle count and a plurality of link identifications, the count information of the awake windows (Idle count in Table 2) may be applied to multi-links (multi-links that are about to enter the power save mode). In this case, the awake window count in each link that is about to enter the TDLS peer power save mode is less than or equal to a value indicated by the count information of the awake windows. In other words, in the case of the presence of multi-links that are about to enter the power save mode, a single Idle count in Table 2 may refer to a maximum value. For example, the count (i.e., Idle count in Table 2) of consecutive awake windows in each link may be different or the same, but the count of consecutive awake windows in each link is less than or equal to a set value of the Idle count in Table 2. However, the present disclosure is not limited to this. For example, in another example, in the case of a single idle count and a plurality of link identifications, the count of consecutive awake windows in multi-links that are about to enter the power save mode may be set to be consistent, that is, equal to the set value of a single Idle count.

Figure 6:
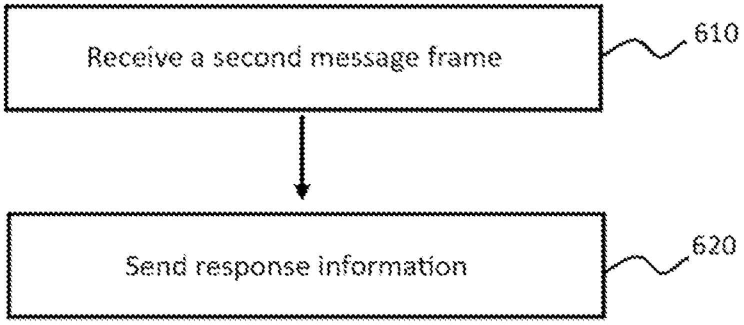
FIG. 6 is a flowchart illustrating a communication method according to an example.

FIG. 6 is a flowchart illustrating a communication method according to an example. The communication method shown in FIG. 5 may be applied to a TDLS peer PSM responder. The TDLS peer PSM responder refers to a STA performing TDLS communication with a STA that is about to enter the power save mode.

According to the examples of the present disclosure, either the TDLS setup requester or the TDLS setup responder may be used as the TDLS peer PSM responder.

For example, in a case where the initiator that performs the communication method shown in FIG. 3 is a STA performing TDLS communication with a STA that is about to enter the power save mode (i.e., the initiator is the TDLS peer PSM responder), the communication method shown in FIG. 3 described above may further include the communication method shown in FIG. 6. For example, in a case where the receiver that performs the communication method shown in FIG. 4 is a STA performing TDLS communication with a STA that is about to enter the power save mode (i.e., the receiver is the TDLS peer PSM responder), the communication method shown in FIG. 4 described above may further include the communication method shown in FIG. 6.

Referring to FIG. 6, in step 610, the second message frame may be received in one of the multi-links (i.e., the second message frame is acquired). The multi-links may refer to a plurality of TDLS links supported by a non-AP STA MLD to which the TDLS peer PSM responder belongs. As a non-limiting example, the second message frame may be a TDLS peer PSM request frame. The second message frame may include periodic wakeup information corresponding to at least one of the multi-links. The at least one link refers to a link that is about to enter the power save mode.

That is, the second message frame may carry the periodic wakeup information suggested by the TDLS peer PSM initiator, and the TDLS peer PSM responder may receive the second message frame from the TDLS peer PSM receiver and acquire periodic wakeup information of one or more links that are about to enter the power save mode. For example, the periodic wakeup information may have individual information parameters, as shown in Table 2, and for the sake of brevity, repeated descriptions are omitted here.

In step 620, response information for the second message frame may be sent. For example, when the TDLS peer PSM responder accepts the periodic wakeup information suggested in the second message frame, a response may be made by means of the TDLS peer PSM response frame carrying response information on “Accept” (e.g., a status code indicates “SUCCESS”), or otherwise may carry response information on “Reject.”

According to the communication method shown in FIG. 5 and FIG. 6, the periodic wakeup information in the present link and/or other links (multi-links) may be negotiated in one link, thus saving signaling.

However, the examples of the present disclosure are not limited to this, and respective power save modes may also be established in each link that is about to enter the power save mode. That is, information related to the awake window is negotiated in each link (i.e., the TDLS peer PSM request frame and the TDLS peer PSM response frame are transmitted in each link). In this case, it is possible to make the awake schedule information elements compatible with an old station (for example, a station that merely supports single-link communication), but more signaling will be needed.

Figure 7:
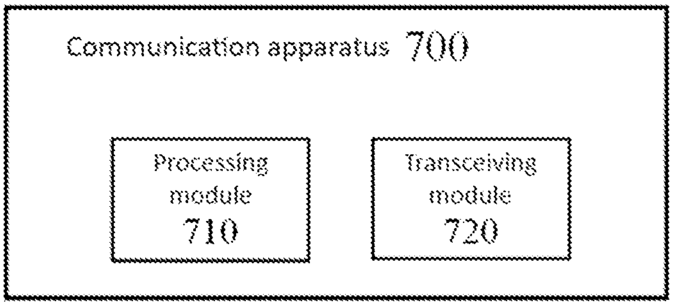
FIG. 7 is a flowchart illustrating a communication apparatus according to an example.

FIG. 7 is a block diagram illustrating a communication apparatus 700 according to an example of the present disclosure.

Referring to FIG. 7, the communication apparatus 700 may include a processing module 710 and a transceiving module 720.

In one example embodiment, the communication apparatus shown in FIG. 7 may be applied to a sender, and may perform the communication method shown in FIG. 3. For example, the processing module 710 may be configured to determine a first message frame in one of multi-links; and the transceiving module 720 may be configured to send the first message frame. The first message frame may include support capability information indicating a support capability for a TDLS peer power save mode in the multi-links, and the multi-links can support TDLS communication. The first message frame and the support capability information included in the first message frame may be similar to the examples described with reference to FIG. 3 and Table 1, and for the sake of brevity, the repeated descriptions are omitted here.

In another example embodiment, the communication apparatus shown in FIG. 7 may be applied to a receiver, and may perform the communication method shown in FIG. 4. For example, the transceiving module 720 may be configured to receive a first message frame in one of multi-links; and the processing module 710 may be configured to perform a communication operation based on the first message frame. The first message frame may include support capability information indicating a support capability for a TDLS peer power save mode in the multi-links, and the multi-links can support TDLS communication. The first message frame and the support capability information included in the first message frame may be similar to the examples described with reference to FIG. 4 and Table 1, and for the sake of brevity, the repeated descriptions are omitted here.

In another example embodiment, the communication apparatus shown in FIG. 7 may be applied to a TDLS peer PSM initiator, and may perform the communication method shown in FIG. 5. For example, the processing module 710 may be configured to determine a second message frame in one of multi-links; and the transceiving module 720 may be configured to send the second message frame. The second message frame may include periodic wakeup information corresponding to at least one of the multi-links. The second message frame and the periodic wakeup information included in the second message frame may be similar to the examples described with reference to FIG. 5 and Table 2, and for the sake of brevity, the repeated descriptions are omitted here.

In another example embodiment, the communication apparatus shown in FIG. 7 may be applied to a TDLS peer PSM responder, and may perform the communication method shown in FIG. 6. For example, the transceiving module 720 may be configured to receive a second message frame in one of multi-links. The second message frame may include periodic wakeup information corresponding to at least one of the multi-links. The processing module 710 may be configured to determine whether to accept awake period information suggested in the second message frame, and control the transceiving module 720 to send response information for the second message frame. The second message frame and the periodic wakeup information included in the second message frame may be similar to the examples described with reference to FIG. 6 and Table 2, and for the sake of brevity, the repeated descriptions are omitted here.

In addition, the communication apparatus 700 shown in FIG. 7 is merely illustrative, and the examples of the present disclosure are not limited to this. For example, the communication apparatus 700 may also include other modules, such as a memory module. In addition, the individual module in the communication apparatus 700 may be combined into more complex modules or may be divided into more separate modules.

According to the communication method and the communication apparatus in the examples of the present disclosure, a device may be in a PS mode in a case that a TDLS link is established, which can save power and improve spectrum utilization.

Based on the same principle as the method provided in the examples of the present disclosure, an example of the present disclosure further provides an electronic device. The electronic device includes one or more processors and a memory. The memory is configured to store machine-readable instructions (which may also be referred to as a "computer program"). One or more processors are configured to execute the machine-readable instructions to implement the method described with reference to FIG. 3 to FIG. 6.

An example of the present disclosure further provides a non-transitory computer-readable storage medium configured to store a computer program in there, the computer program, when executed by one or more processors, being configured to implement the method described with reference to FIG. 3 to FIG. 6.

In an example, one or more processors may be configured to implement or execute various illustrative logic boxes, modules, and circuits described in conjunction with the present disclosure. The one or more processors may be a central processing unit (CPU), a universal processor, a digital signal processor (DSP), an application specific integrated circuit (ASIC), a field programmable gate array (FPGA), or other programmable logic devices, transistor logic devices, hardware components, or any combination of the above. The one or more processors may also be a combination that implements a computing function, such as a combination of one or more microprocessors, a combination of a DSP and a microprocessor, etc.

In an example, the memory may be, for example, a read only memory (ROM), a random access memory (RAM), an electrically erasable programmable read only memory (EEPROM), a compact disc read only memory (CD-ROM) or other optical disc storage, optical disk storage (including a compact disc, a laser disc, an optical disc, a digital general disc, a Blu-ray disc, etc.), a magnetic disc storage media, or other magnetic storage devices, or any other medium which can be configured to carry or store program codes in the form of instructions or data structures and can be accessed by a computer, but is not limited this.

It should be understood that although the various steps in the flowcharts of the accompanying drawings are sequentially displayed as indicated by arrows, these steps are not necessarily performed in the order indicated by the arrows. Except as explicitly stated here, the execution of these steps is not strictly limited and may be performed in other sequences. Moreover, at least some of the steps in the flowcharts of the accompanying drawings may include a plurality of sub-steps or stages, which are not necessarily performed at the same time, but may be executed at different times. The execution order of these sub-steps or stages is also not necessarily performed sequentially, but may be performed in turn or alternately with at least a portion of other steps or sub-steps or stages of other steps.

Although the present disclosure has been shown and described with reference to some examples of the present disclosure, those skilled in the art will understand that various changes in form and detail may be made without departing from the scope of the present disclosure. The scope of the present disclosure shall not be limited by the examples, but rather by the appended claims and their equivalents.

The invention claimed is:

1. A communication method, comprising:

determining a first message frame in one of multi-links, and sending the first message frame; or receiving the first message frame in one of the multi-links, wherein the first message frame comprises support capability information indicating a support capability for a tunneled direct link setup (TDLS) peer power save mode in the multi-links, and wherein the multi-links support TDLS communication, wherein it is identified that the TDLS peer power save mode is supported in the multi-links, in response to an activate primitive of the TDLS peer power save mode being set to a first specific value and the support capability information being set to a second specific value.

2. The communication method according to claim 1, further comprising:

acquiring a second message frame in one of the multi-links, wherein the second message frame comprises periodic wakeup information corresponding to at least one of the multi-links.

3. The communication method according to claim 2, wherein the periodic wakeup information comprises: a link identification corresponding to each link that is about to enter the TDLS peer power save mode, and information related to an awake time.

4. The communication method according to claim 3, wherein the information related to the awake time comprises: start information of an awake window, end information of the awake window, and count information of the awake windows.

5. The communication method according to claim 4, wherein the start information of the awake window comprises an offset identification and an interval identification, wherein the offset identification is set based on a timing synchronization function (TSF) parameter, wherein the awake window begins at a TSF value, and the TSF value satisfies a condition determined based on the TSF value, the offset identification and the interval identification.

6. The communication method according to claim 3, wherein the information related to the awake time is set to be the same or different for at least one link.

7. The communication method according to claim 6, wherein a count information of the awake windows is set to a count of consecutive awake windows, and wherein separate addressed frame is not received during said count of consecutive awake windows before a wakeup schedule is deleted.

8. The communication method according to claim 7, wherein a count of the awake windows in each link that is about to enter the TDLS peer power save mode is less than or equal to a value indicated by the count information of the awake windows, in a case that the count information of the awake windows is applied to multi-links.

9. An electronic device, comprising:

a memory, one or more processors, and a computer program stored in the memory and runnable on the one or more processors, the computer program when executed by the one or more processors, causes the one or more processors to collectively:

determine a first message frame in one of multi-links, and send the first message frame; or receive the first message frame in one of the multi-links, wherein the first message frame comprises support capability information indicating a support capability for a tunneled direct link setup (TDLS) peer power save mode in the multi-links, and wherein the multi-links support TDLS communication, wherein it is identified that the TDLS peer power save mode is supported in the multi-links, in response to an activate primitive of the TDLS peer power save mode being set to a first specific value and the support capability information being set to a second specific value.

10. A non-transitory computer-readable storage medium, storing a computer program, the computer program when executed by one or more processors, causes the one or more processors to collectively execute a method comprising:

determining a first message frame in one of multi-links, and sending the first message frame; or receiving the first message frame in one of the multi-links, wherein the first message frame comprises support capability information indicating a support capability for a tunneled direct link setup (TDLS) peer power save mode in the multi-links, and wherein the multi-links support TDLS communication, wherein it is identified that the TDLS peer power save mode is supported in the multi-links, in response to an activate primitive of the TDLS peer power save mode being set to a first specific value and the support capability information being set to a second specific value.

11. The electronic device according to claim 9, wherein the computer program when executed by the one or more processors, further causes the one or more processors to collectively:

acquire a second message frame in one of the multi-links, wherein the second message frame comprises periodic wakeup information corresponding to at least one of the multi-links.

12. The electronic device according to claim 11, wherein the periodic wakeup information comprises: a link identification corresponding to each link that is about to enter the TDLS peer power save mode, and information related to an awake time.

13. The electronic device according to claim 12, wherein the information related to the awake time comprises: start information of an awake window, end information of the awake window, and a count information of the awake windows.

14. The electronic device according to claim 13, wherein the start information of the awake window comprises an offset identification and an interval identification, wherein the offset identification is set based on a timing synchronization function (TSF) parameter, wherein the awake window begins at a TSF value, and the TSF value satisfies a condition determined based on the TSF value, the offset identification and the interval identification.

15. The electronic device according to claim 12, wherein the information related to the awake time is set to be the same or different for at least one link.

16. The electronic device according to claim 15, wherein a count information of the awake windows is set to a count of consecutive awake windows, and wherein separate addressed frame is not received during said count of consecutive awake windows before a wakeup schedule is deleted.

17. The electronic device according to claim 16, wherein a count of the awake windows in each link that is about to enter the TDLS peer power save mode is less than or equal to a value indicated by the count information of the awake windows, in a case that the count information of the awake windows is applied to multi-links.

* * * * *